(12) United States Patent
Vijayan et al.

(10) Patent No.: US 10,097,095 B2
(45) Date of Patent: Oct. 9, 2018

(54) DC CONVERTERS WITH MODIFIED DROOP CONTROL AND METHOD OF USE

(71) Applicant: General Electric Company, Schenectady, NY (US)

(72) Inventors: Pradeep Vijayan, Karnataka (IN); Vishnu Mahadeva Iyer, Raleigh, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/272,179

(22) Filed: Sep. 21, 2016

(65) Prior Publication Data
US 2018/0083545 A1    Mar. 22, 2018

(51) Int. Cl.
*H02M 3/335* (2006.01)
*H02M 1/088* (2006.01)
*H02M 7/48* (2007.01)
*H02M 1/00* (2006.01)

(52) U.S. Cl.
CPC ....... *H02M 3/33546* (2013.01); *H02M 1/088* (2013.01); *H02M 3/335* (2013.01); *H02M 7/4826* (2013.01); *H02M 2001/0009* (2013.01); *H02M 2007/4815* (2013.01)

(58) Field of Classification Search
CPC .......................... H02M 3/335; H02M 3/33546
USPC .. 363/21.02, 21.05, 21.06, 21.12, 21.14, 40, 363/50–56.02, 95, 97, 98
See application file for complete search history.

(56) References Cited

U.S. PATENT DOCUMENTS

| | | | |
|---|---|---|---|
| 7,567,064 B2 | 7/2009 | Ponnaluri et al. | |
| 8,014,176 B2* | 9/2011 | Melanson | H01F 3/10 363/21.02 |
| 8,581,565 B2 | 11/2013 | Tang et al. | |

(Continued)

FOREIGN PATENT DOCUMENTS

| | | |
|---|---|---|
| CN | 103151785 B | 12/2013 |
| CN | 104753059 A | 7/2015 |
| EP | 3 021 474 A1 | 5/2016 |

OTHER PUBLICATIONS

S Anand et al., "Modified droop controller for paralleling of dc-dc converters in standalone dc system", IET Power Electronics, vol. 5, Issue: 6, pp. 782-789, Jul. 2012.

(Continued)

*Primary Examiner* — Adolf Berhane
*Assistant Examiner* — Nusrat Quddus
(74) *Attorney, Agent, or Firm* — GE Global Patent Operation; Nitin Joshi

(57) ABSTRACT

A variable frequency resonant converter includes an inverter stage, a resonant circuit, a transformer, a rectifier stage, and a controller. The inverter and rectifier stages include first and second FET devices. The inverter converts a DC input signal to a first AC signal. The resonant circuit is coupled to the inverter stage and filters the first AC signal. The transformer is coupled to the resonant circuit and converts the first AC signal to a second AC signal. The rectifier stage is coupled to the transformer and converts the second AC signal to a DC output signal. The controller is configured to operate both of the first and second FET devices substantially at a resonant frequency at least partially defined by the resonant circuit to generate the DC output signal according to a voltage setpoint.

17 Claims, 5 Drawing Sheets

(56) References Cited

U.S. PATENT DOCUMENTS

| | | | |
|---|---|---|---|
| 9,178,433 B2 | 11/2015 | Jutras et al. | |
| 2011/0205761 A1* | 8/2011 | Tschirhart | H02M 3/3376 |
| | | | 363/21.02 |
| 2012/0243274 A1 | 9/2012 | Feng et al. | |
| 2014/0307482 A1 | 10/2014 | Chen et al. | |
| 2015/0109824 A1 | 4/2015 | Chen et al. | |
| 2015/0349647 A1 | 12/2015 | Zane et al. | |
| 2016/0094149 A1* | 3/2016 | Pahlevaninezhad | H02M 1/126 |
| | | | 363/97 |

OTHER PUBLICATIONS

Liu et al., "Load sharing using droop control for parallel operation of matrix converters as distributed generator interfaces in isolated mode", 2012 IEEE Energy Conversion Congress and Exposition (ECCE), pp. 962-968, Sep. 15-20, 2012, Raleigh, NC.

V P Oberto et al., "An improved droop control strategy for load current sharing in output parallel-connected DC-DC converters", Industry Applications (INDUSCON), 2014 11th IEEE/IAS International Conference on, pp. 1-7, Dec. 7-10, 2014, Juiz de Fora.

Partial European Search Report and Opinion issued in connection with corresponding EP Application No. 17191318.9 dated Feb. 13, 2018.

\* cited by examiner

DC CONVERTERS WITH MODIFIED DROOP CONTROL AND METHOD OF USE

BACKGROUND

The field of the disclosure relates generally to direct current (DC) converters and, more particularly, to modified droop control of DC converters and methods of use.

Many known electrical power applications utilize parallel power sources, or redundant power sources, to share an electrical load. Parallel power sources improve reliability for the overall electrical power system by dynamically controlling power output as loads and power sources are connected and disconnected. Such applications typically demand a particular range of output voltage from the power sources and, to properly share the electrical load, the output voltages of parallel power sources should be balanced. For example, in an application where the electrical load is shared equally, each parallel power source should have a substantially equal output voltage. Conversely, unequal output voltages result in unequal sharing of the electrical load.

Many known electrical power applications further utilize DC converters to convert alternating current (AC) power to DC, to step-up DC voltages, or to step-down DC voltages to the appropriate range for a DC bus or a DC load. Such DC converters include DC-DC and AC-DC converters. In some electrical power applications, DC converters receive a variable input voltage that demands certain voltage regulation be carried out by the DC converter. One such known DC converter is a variable frequency resonant converter, sometimes referred to as an LLC converter (so called for its use of an inductor-inductor-capacitor power circuit). In a variable frequency resonant converter, the output voltage of the converter is controlled by adjusting a switching frequency of semiconductor devices within the converter.

Generally, parallel variable frequency resonant converters are characterized by droop, which includes a frequency droop component and a voltage droop component. A given converter's droop characteristic governs its real and reactive power output as switching frequency varies. Resonant frequency converters are characterized by a resonant frequency at which the converter achieves peak efficiency. A common control scheme for parallel variable frequency resonant converters is droop control. As the electrical load changes, so too does the demanded power. In a droop control scheme, the switching frequency is adjusted based on the power output to maintain an output voltage setpoint. Consequently, the efficiency of the variable frequency resonant converter varies accordingly.

BRIEF DESCRIPTION

In one aspect, a variable frequency resonant converter is provided. The direct current (DC) to DC converter includes an inverter stage a resonant circuit, a transformer, a rectifier stage, and a controller. The inverter and rectifier stages include first and second FET devices. The inverter converts a DC input signal to a first AC signal. The resonant circuit is coupled to the inverter stage and filters the first AC signal. The transformer is coupled to the resonant circuit and converts the first AC signal to a second AC signal. The rectifier stage is coupled to the transformer and converts the second AC signal to a DC output signal. The controller is configured to operate both of the first and second FET devices substantially at a resonant frequency at least partially defined by the resonant circuit to generate the DC output signal according to a voltage setpoint.

In another aspect, an electrical power system is provided. The DC to DC converter system includes a DC bus, a first DC converter, and a second DC converter. The DC bus is configured to be coupled to an electrical load. The first DC converter defines a first droop characteristic and a first resonant frequency. The first DC converter is coupled to the DC bus and is configured to operate substantially at the first resonant frequency to generate a DC output voltage on the DC bus according to a first variable voltage setpoint. The second DC converter defines a second droop characteristic and a second resonant frequency. The second DC converter is coupled to the DC bus and is configured to operate substantially at the second resonant frequency to generate the DC output voltage on the DC bus according to a second variable voltage setpoint. The second DC converter is further configured to share the electrical load with the first DC converter.

In yet another aspect, a method of controlling a DC to DC converter is provided. The method includes measuring an output current of the DC to DC converter. The method further includes generating a reference voltage as a function of the output current, an input voltage of the DC to DC converter, and a voltage setpoint for the DC to DC converter. The method further includes computing the voltage setpoint such that the reference voltage is substantially constant. The method further includes computing the reference voltage to correspond with a resonant frequency of the DC to DC converter. The method further includes operating the DC to DC converter substantially at the resonant frequency according to the reference voltage to generate a DC output voltage.

DRAWINGS

These and other features, aspects, and advantages of the present disclosure will become better understood when the following detailed description is read with reference to the accompanying drawings in which like characters represent like parts throughout the drawings, wherein.

Figure 1:
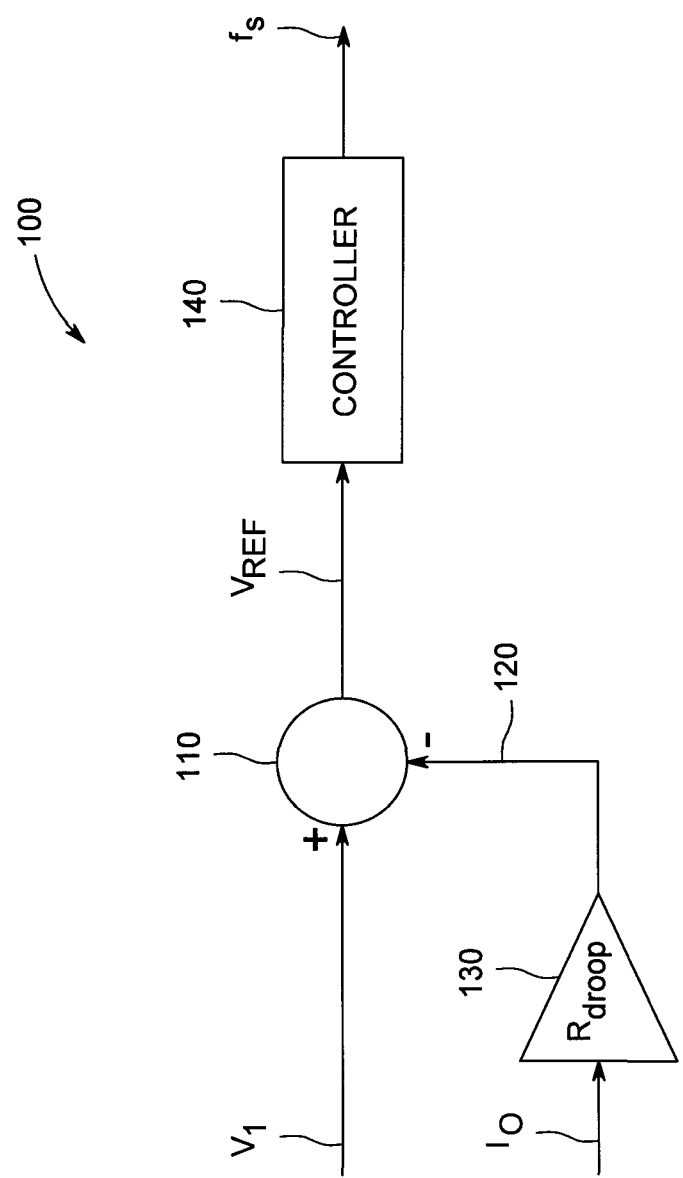
FIG. 1 is a schematic diagram of an exemplary known droop control system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Embodiments of the present disclosure provide DC converters with a modified droop control. More specifically, the present disclosure describes use of a modified droop control to operate parallel variable frequency resonant converters substantially at their resonant frequency for maximum efficiency, and to ensure equal load sharing among converters. It is realized herein that in certain applications, input voltage requirements and output voltage requirements may be relaxed such that a modified droop control can operate a variable frequency resonant converter at or near resonance at all times. The modified droop control enables operation at resonance by adjusting the reference voltage based on input voltage and measured power to maintain operation substantially at the resonant frequency.

FIG. 1 is a schematic diagram of an exemplary known droop control system 100 for use in a variable frequency resonant converter. Droop control system 100 produces a switching frequency output, $f_S$, as a function of a voltage setpoint, $V_1$, and an output current, $I_O$. The switching frequency, $f_S$, may be used for regulating a voltage output of the variable frequency resonant converter. Droop control system 100 includes a summation 110 of the voltage setpoint, $V_1$, and a negated feedback voltage 120. Feedback voltage 120 is computed based on the output current, $I_O$, and a droop characteristic for the variable frequency resonant converter. The droop characteristic is implemented as a gain, $R_{droop}$, applied via an amplifier 130 to the output current $I_O$. The gain, $R_{droop}$, represents a droop impedance and, thus, feedback voltage 120 is computed as $I_O \times R_{droop}$.

Droop control system 100 includes a controller 140 that receives the result of summation 110, i.e., a reference voltage, $V_{ref}$. Controller 140 generates the switching frequency, $f_S$, according to the reference voltage, $V_{ref}$. More specifically, controller 140 translates the reference voltage, $V_{ref}$, to the switching frequency, $f_S$, based on the droop characteristic for the variable frequency resonant converter. Such a translation may be embodied in, for example, and without limitation, a mathematic equation or a look-up table.

Figure 2:
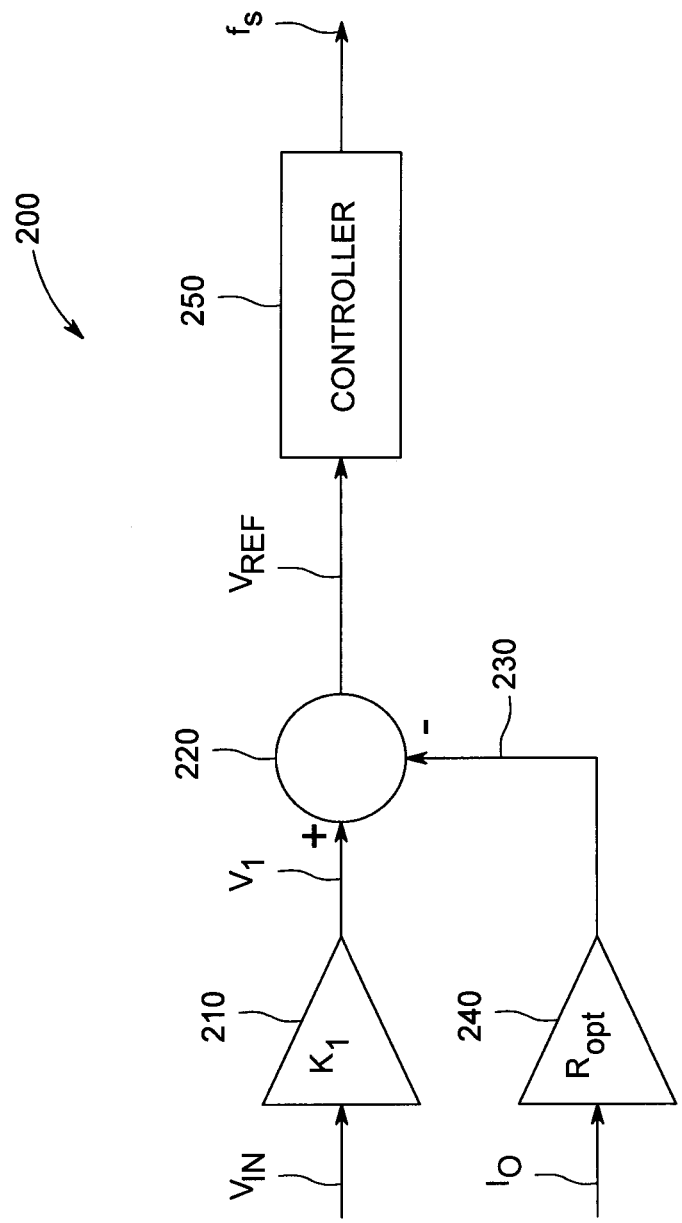
FIG. 2 is a schematic diagram of an exemplary improved droop control system.

FIG. 2 is a schematic diagram of an exemplary modified droop control system 200 for use in a variable frequency resonant converter. Droop control system 200 produces a switching frequency output, $f_S$, as a function of an input voltage, $V_{IN}$, an output current, $I_O$, and a voltage setpoint, $V_1$. The switching frequency, $f_S$, may be used for regulating a voltage output of the variable frequency resonant converter.

Droop control system 200 includes an amplifier 210 that applies a gain, $k_1$, to the input voltage, $V_{IN}$, to the variable frequency resonant converter. Amplifier 210, in certain embodiments, applies gain, $k_1$, to attenuate input voltage, $V_{IN}$, i.e., $k_1$ is less than 1. Amplifier 210 adjusts the voltage setpoint, $V_1$, based on the input voltage, $V_{IN}$.

Droop control system includes a summation 220 of the voltage setpoint, $V_1$, and a negated feedback voltage 230. Feedback voltage 230 is computed based on the output current, $I_O$, and a droop characteristic for the variable frequency resonant converter operating substantially at resonance. The droop characteristic at resonance is implemented as a gain, $R_{OPT}$, applied via an amplifier 240 to the output current, $I_O$. The gain, $R_{OPT}$, represents an optimal droop impedance and, thus feedback voltage 230 is computed as $I_O \times R_{OPT}$.

Droop control system 200 includes a controller 250 that receives the result of summation 220, i.e., a reference voltage, $V_{ref}$. Controller 250 generates the switching frequency, $f_S$, according to the reference voltage, $V_{ref}$. More specifically, controller 250 translates the reference voltage, $V_{ref}$, to the switching frequency, $f_S$, based on the droop characteristic for the variable frequency resonant converter. Such a translation may be embodied in, for example, and without limitation, a mathematical equation or a look-up table.

Gain, $k_1$, applied to the input voltage, $V_{IN}$, by amplifier 210 is selected such that the voltage setpoint, $V_1$, is a nominal voltage setpoint within a desired range of output voltage. In certain embodiments, the input voltage, $V_{IN}$, varies substantially. For example, and without limitation, the input voltage, $V_{IN}$, may vary from 500 Volts DC to 550 Volts Dc. In certain embodiments, the desired range of output voltage includes 22 Volts DC to 29 Volts DC, inclusively. The voltage setpoint, $V_1$, is set such that the reference voltage, $V_{ref}$, produced by summation 220 produces a substantially constant switching frequency. A switching frequency, $f_S$, is defined as substantially constant if it varies by no more than 2%. Further, the switching frequency, $f_S$, is preferably equal to or near a resonant frequency for the variable frequency resonant converter. The resonant frequency for the variable frequency resonant converter, generally, is the frequency at which the converter operates most efficiently. The switching frequency, $f_s$, is equal to or near the resonant frequency for the variable frequency resonant converter if, when operated at the switching frequency, $f_S$, the variable frequency resonant converter operates substantially at resonance, or substantially at the resonant frequency. A variable frequency resonant converter operates substantially at resonance when operating within 2% of the resonant frequency.

Figure 3:
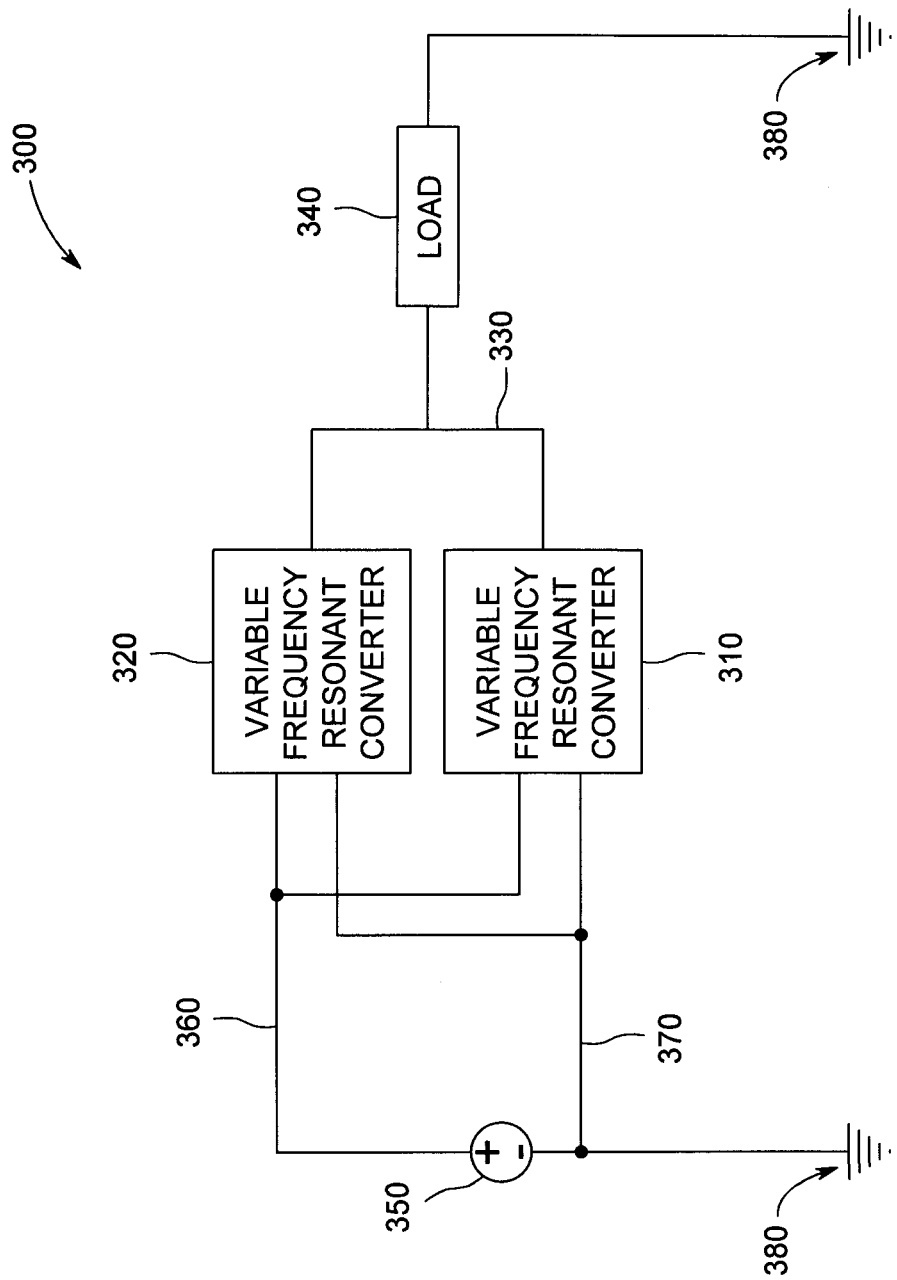
FIG. 3 is a block diagram of an exemplary electrical power system utilizing variable frequency resonant converters that are used with the droop control system shown in FIG. 2.

FIG. 3 is a block diagram of an exemplary electrical power system 300. Electrical power system 300 includes variable frequency resonant converters 310 and 320 coupled in parallel to a DC bus 330. DC bus 330 serves an electrical load 340. The DC output voltage put onto DC bus 330 is regulated for electrical load 340 to be within a predefined range. For example, and without limitation, in certain embodiments, DC bus 330 is regulated to be within a range of 22 Volts DC and 29 Volts DC, inclusively. Variable frequency resonant converters 310 and 320 are configured to share electrical load 340. In certain embodiments, electrical load 340 is shared equally among parallel converters, such as variable frequency resonant converters 310 and 320. In such embodiments, the output voltage generated by each of variable frequency resonant converters 310 and 320 should be substantially equal. Substantially equal output voltages are generally within 1%. Substantially equal output voltages facilitate equal power sharing among the parallel converters. In certain embodiments, output voltages may vary by greater than 1%, depending on the amount of imbalance tolerated in the application, and further depending on the interconnecting impedances.

Electrical power system 300 includes a DC voltage source 350 that provides an input voltage 360 that is supplied to variable frequency resonant converters 310 and 320. Variable frequency resonant converters 310 and 320 are also supplied a reference signal 370 that is coupled to a reference side of DC voltage source 350. DC voltage source 350 is referenced to a ground 380. In alternative embodiments, DC voltage source 350 is not referenced to ground 380. Electrical load 340 is also referenced to ground 380. In alternative embodiments, electrical load 340 may be referenced to a node other than ground 380.

Variable frequency resonant converters 310 and 320 embody droop control system 200 (shown in FIG. 2). More specifically, each of variable frequency resonant converters 310 and 320 is configured to operate substantially at its respective resonant frequency. Each of variable frequency resonant converters 310 and 320 is independently controlled to adjust a reference voltage according to measured output power put onto DC bus 330 and input voltage 360 to maintain operation substantially at its respective resonant frequency.

Figure 4:
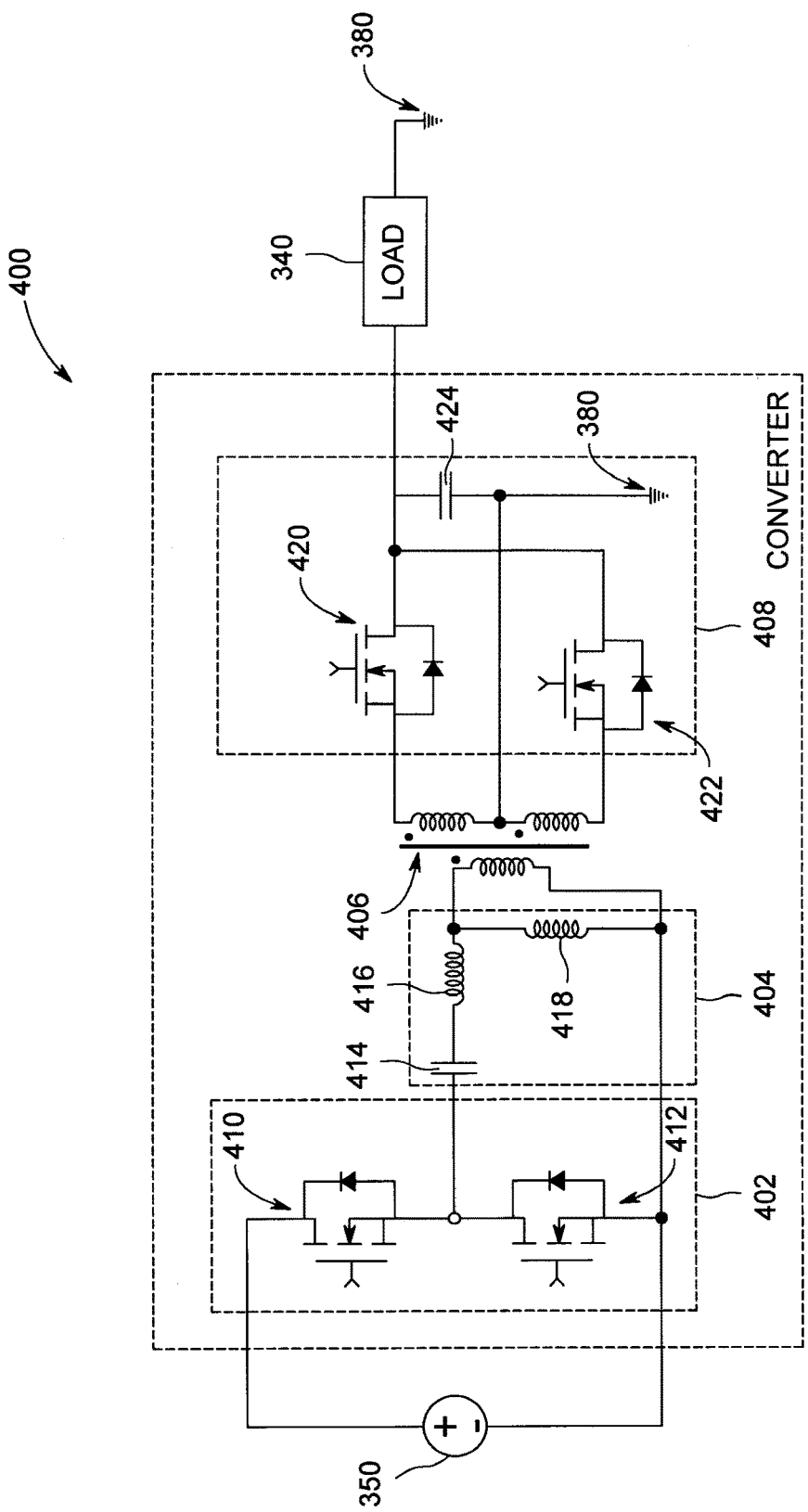
FIG. 4 is a schematic diagram of an exemplary variable frequency resonant converter for use in the electrical power system shown in FIG. 3.

FIG. 4 is a schematic diagram of an exemplary variable frequency resonant converter 400 for use in electrical power system 300 (shown in FIG. 3). Variable frequency resonant converter 400 is coupled to DC voltage source 350 and electrical load 340 (shown in FIG. 3). Both variable frequency resonant converter 400 and electrical load 340 are referenced to ground 380 (shown in FIG. 3).

Variable frequency resonant converter 400 includes an inverter stage 402, a resonant circuit 404, a transformer 406, and a rectifier stage 408. Inverter stage 402 is coupled to the output of DC voltage source 350 and includes field effect transistor (FET) devices 410 and 412. FET devices 410 and 412 are operated at a switching frequency to convert an input voltage signal to a first AC signal.

Resonant circuit 404 is coupled to inverter stage 402 and is configured to filter the first AC signal. Resonant circuit 404 includes a capacitor 414, an inductor 416, and an inductor 418. Resonant circuit 404 at least partially defines a resonant frequency of variable frequency resonant converter 400. In alternative embodiments, inductor 418 is omitted and transformer 406 provides inductance in its place.

Transformer 406 is coupled to resonant circuit 404 and is configured to convert the first AC signal to a second AC signal. Transformer 406 is a high frequency transformer for stepping-up or stepping-down intermediate AC voltages within variable frequency resonant converter 400.

Rectifier stage 408 is coupled to transformer 406 and includes FET devices 420 and 422. FET devices 420 and 422 are operated at the switching frequency, similar to FET devices 410 and 412. FET devices 420 and 422 are switched to convert the second AC signal to a DC output voltage across a capacitor 424. The DC output voltage is then supplied to electrical load 340.

Variable frequency resonant converter 400 is most-efficiently operated at the resonant frequency at least partially defined by resonant circuit 404. Variable frequency resonant converter 400 is operated at the resonant frequency when FET devices 410, 412, 420, and 422 are switched at a switching frequency equal to the resonant frequency.

Figure 5:
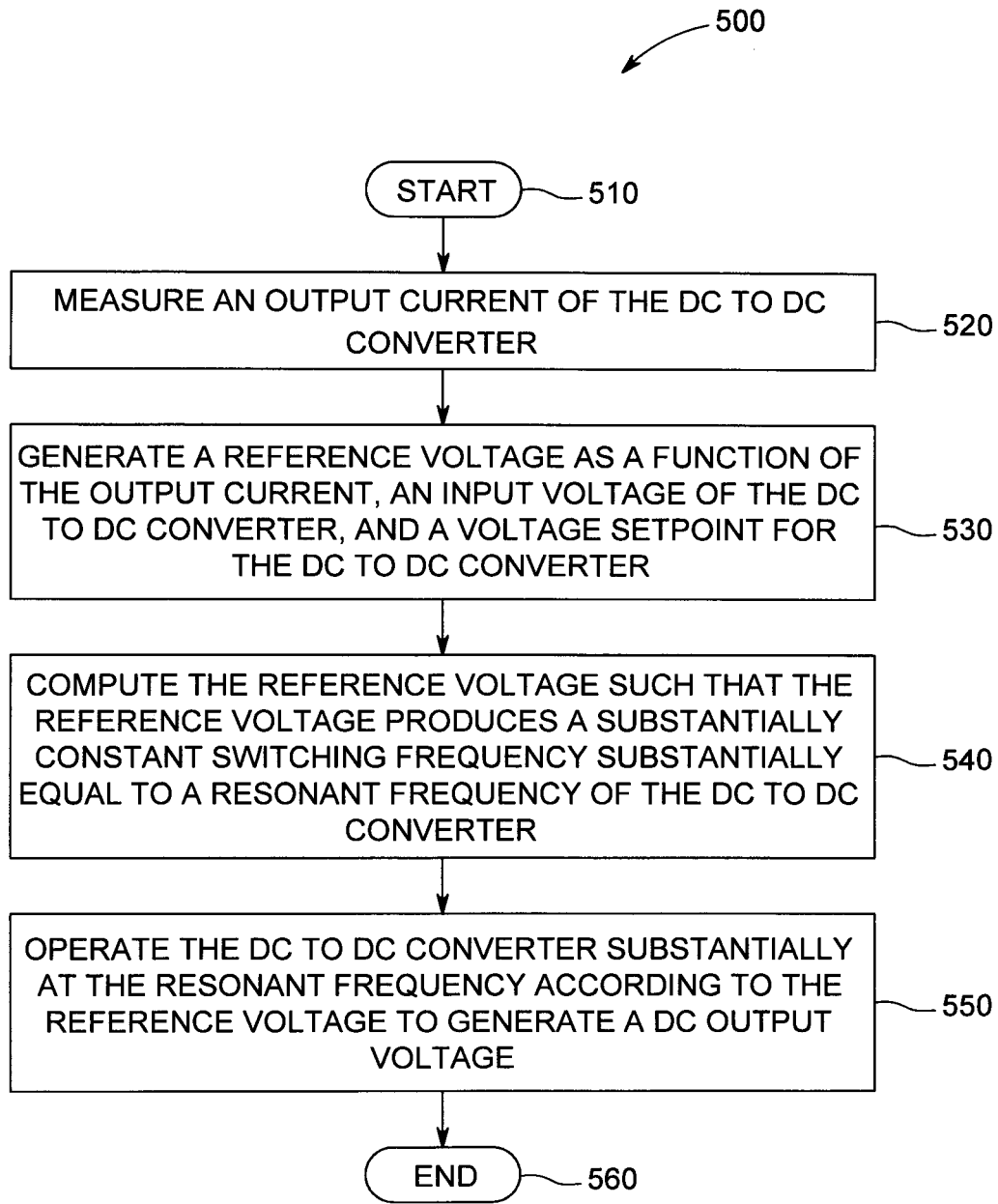
FIG. 5 is a flow diagram of an exemplary method of using the droop control system shown in FIG. 2.

FIG. 5 is a flow diagram of an exemplary method 500 of using droop control system 200 (shown in FIG. 2) for controlling a DC to DC converter, such as variable frequency resonant converter 400 (shown in FIGS. 3 and 4). Referring to FIGS. 2-5, method 500 begins at a start step 510. At a feedback step 520, an output current, $I_O$, of variable frequency resonant converter 400 is measured and fed-back in droop control system 200.

At a generation step 530, a reference voltage, $V_{ref}$, is generated as a function of the output current, Io, an input voltage, $V_{IN}$, and a voltage setpoint, $V_1$. The voltage setpoint, $V_1$, is computed such that the reference voltage, $V_{ref}$, produces a substantially constant switching frequency at a computation step 540. The reference voltage, $V_{ref}$, is computed to correspond with a resonant frequency of variable frequency resonant converter 400.

In certain embodiments, method 500 includes operating variable frequency resonant converter 400 in an open loop configuration and at the resonant frequency to determine the natural droop, or droop characteristic, of variable frequency resonant converter 400. Further, in certain embodiments, the resonant frequency is computed for variable frequency resonant converter 400. Given the droop characteristic, and the input voltage, $V_{IN}$, the voltage setpoint, $V_1$, is computed such that the voltage reference, $V_{ref}$, produces a substantially constant switching frequency. In certain embodiments, input voltage, $V_{IN}$, may vary substantially. Likewise, the voltage setpoint, $V_1$, may vary within an acceptable range for DC bus 330 and electrical load 340.

At an operation step 550, variable frequency resonant converter 400 is operated substantially at the resonant frequency according to the reference voltage, $V_{ref}$, to generate a DC output voltage. Method 500 terminates at an end step 560.

The above described embodiments of DC converters provide a modified droop control. More specifically, the present disclosure describes use of a modified droop control to operate parallel connected variable frequency resonant converters substantially at their resonant frequency for maximum efficiency and, at the same time, ensuring equal load sharing among converters. It is realized herein that in certain applications, input voltage requirements and output voltage requirements may be relaxed such that a modified droop control can operate a variable frequency resonant converter at or near resonance at all times. The modified droop control enables operation at resonance by adjusting the voltage setpoint based on input voltage and measured power to maintain operation substantially at the resonant frequency.

An exemplary technical effect of the methods, systems, and apparatus described herein includes at least one of: (a) widening the range of acceptable input voltages for DC converters; (b) leveraging wide ranges of acceptable output voltages in certain DC converter applications; (c) operating variable frequency resonant converters substantially at resonant frequency; (d) improving efficiency of DC converters by operation at resonance; (e) reducing cooling loads of DC converters through efficiency improvements; (f) facilitating efficient operation of multiple parallel DC converters through respective operation at resonance; and (g) improving load sharing among parallel DC converters and, at the same time ensuring more efficient operation.

Exemplary embodiments of methods, systems, and apparatus for parallel DC converters are not limited to the specific embodiments described herein, but rather, components of systems and/or steps of the methods may be utilized independently and separately from other components and/or steps described herein. For example, the methods may also be used in combination with other non-conventional parallel DC converters, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable frequency resonant converter comprising:
   an inverter stage configured to convert a direct current (DC) input signal to a first alternating current (AC) signal, said inverter stage comprising a first switching device;
   a resonant circuit coupled to said inverter stage, said resonant circuit configured to filter the first AC signal and at least partially define a resonant frequency;
   a transformer coupled to said resonant circuit, said transformer configured to convert the first AC signal to a second AC signal;
   a rectifier stage coupled to said transformer, said rectifier stage configured to convert the second AC signal to a DC output signal, said rectifier stage comprising a second switching device;
   a controller configured to operate both of said first switching device and said second switching device substantially at the resonant frequency to generate the DC output signal according to a reference voltage; and
   wherein said controller comprises a droop control system configured to generate the reference voltage based on a variable-voltage DC input signal and a measured output current, said controller further configured to tune the reference voltage to produce the resonant frequency.

2. The variable frequency resonant converter in accordance with claim 1, wherein said inverter stage is further configured to receive a variable-voltage DC input signal.

3. The variable frequency resonant converter in accordance with claim 1, wherein said rectifier stage is further configured to generate the DC output signal according to the reference voltage defined within a range of 22 volts DC to 29 volts DC, inclusively.

4. The variable frequency resonant converter in accordance with claim 1, wherein said resonant circuit comprises a first capacitor and a first inductor coupled in series with said transformer.

5. The variable frequency resonant converter in accordance with claim 4, wherein said resonant circuit further comprises a second inductor coupled in parallel with said transformer.

6. The variable frequency resonant converter in accordance with claim 1, wherein said transformer comprises a high-frequency transformer.

7. An electrical power system, comprising:
   a DC bus configured to be coupled to an electrical load;
   a first DC converter defining a first droop characteristic and a first resonant frequency, said first DC converter coupled to said DC bus, said first DC converter configured to operate substantially at the first resonant frequency to generate a DC output voltage on said DC bus according to a first variable reference voltage;
   a second DC converter defining a second droop characteristic and a second resonant frequency, said second DC converter coupled to said DC bus, said second DC converter configured to operate substantially at the second resonant frequency to generate the DC output voltage on said DC bus according to a second variable reference voltage, said second DC converter further configured to share the electrical load with said first DC converter; and
   wherein said DC bus is operable in a range of 22 volts DC to 29 volts DC, inclusively.

8. The electrical power system in accordance with claim 7, wherein said first DC converter further comprises a droop control system configured to:
   measure a first output current of said first DC converter;
   generate the first variable reference voltage according to an input voltage, the first output current, and a first voltage setpoint;
   tune the first variable reference voltage such that an output frequency is substantially constant and substantially equal to the first resonant frequency; and operate said first DC converter substantially at the first resonant frequency, the first resonant frequency corresponding to the first variable reference voltage.

9. The electrical power system in accordance with claim 8, wherein said first converter is configured to receive a variable input voltage.

10. The electrical power system in accordance with claim 9, wherein said droop control system is further configured to generate the first variable reference voltage according to the variable input voltage.

11. The electrical power system in accordance with claim 7, wherein said first DC converter comprises a variable frequency resonant converter.

12. The electrical power system in accordance with claim 7 further comprising a third DC converter defining a third droop characteristic and a third resonant frequency, said third DC converter coupled to said DC bus and configured to operate substantially at the third resonant frequency to generate the DC output voltage on said DC bus according to a third variable reference voltage, said third DC converter further configured to share the electrical load with said first DC converter and said second DC converter.

13. A method of controlling a direct current (DC) to DC converter, said method comprising:
measuring an output current of the DC to DC converter;
generating a reference voltage as a function of the output current, an input voltage of the DC to DC converter, and a voltage setpoint for the DC to DC converter;
computing the reference voltage such that the reference voltage produces a substantially constant switching frequency substantially equal to a resonant frequency of the DC to DC converter;
operating the DC to DC converter substantially at the resonant frequency according to the reference voltage to generate a DC output voltage;
receiving a variable input voltage; and
generating the reference voltage as a function of the output current, the variable input voltage, and the voltage setpoint.

14. The method in accordance with claim 13 further comprising computing a resonant frequency for the DC to DC converter.

15. The method in accordance with claim 13 further comprising:
operating the DC to DC converter at the resonant frequency in an open-loop;
determining a droop characteristic for the DC to DC converter; and
computing the reference voltage according to the droop characteristic.

16. The method in accordance with claim 13, wherein operating the DC to DC converter comprises generating the DC output voltage within a range of 22 volts DC to 29 volts DC, inclusively.

17. The method in accordance with claim 13, wherein operating the DC to DC converter at the resonant frequency comprises operating at least one switching device of the DC to DC converter at a switching frequency substantially equal to the resonant frequency.

* * * * *